US008599236B2

(12) United States Patent
Prentice (10) Patent No.: US 8,599,236 B2
(45) Date of Patent: Dec. 3, 2013

(54) UTILIZING A VIDEO IMAGE FROM A VIDEO COMMUNICATION SESSION AS CONTACT INFORMATION

(75) Inventor: Steven Charles Prentice, Ephrata, WA (US)

(73) Assignee: Cisco Technology, Inc., San Jose, CA (US)

( * ) Notice: Subject to any disclaimer, the term of this patent is extended or adjusted under 35 U.S.C. 154(b) by 243 days.

(21) Appl. No.: 13/105,378

(22) Filed: May 11, 2011

(65) Prior Publication Data

US 2012/0287217 A1 Nov. 15, 2012

(51) Int. Cl.
*H04N 7/14* (2006.01)

(52) U.S. Cl.
USPC .................. 348/14.01; 348/14.02; 348/14.03; 348/14.08; 348/14.09

(58) Field of Classification Search
USPC ............................................. 348/14.01–14.1
See application file for complete search history.

(56) References Cited

U.S. PATENT DOCUMENTS

| 6,466,250 | B1* | 10/2002 | Hein et al. ................. 348/14.16 |
| 7,058,168 | B1* | 6/2006 | Knappe et al. ........... 379/204.01 |
| 7,847,815 | B2 | 12/2010 | Patel et al. |
| 2005/0128285 | A1* | 6/2005 | Berenguer ................. 348/14.08 |
| 2007/0188597 | A1 | 8/2007 | Kenoyer |
| 2007/0216809 | A1* | 9/2007 | Pirzada et al. ................. 348/582 |
| 2008/0284841 | A1* | 11/2008 | Modai et al. ................. 348/14.1 |
| 2009/0015660 | A1* | 1/2009 | Vedantham et al. ....... 348/14.09 |
| 2009/0324023 | A1 | 12/2009 | Tian et al. |
| 2010/0202670 | A1 | 8/2010 | Tian et al. |
| 2011/0074911 | A1 | 3/2011 | Khouri et al. |

OTHER PUBLICATIONS

Whitehill, Jacob, et al., Towards Practical Smile Detection, IEEE Transactions on Pattern Analysis and Machine Intelligence, IEEE Computer Society, vol. 31, No. 11, Nov. 2009, pp. 2106-2111.

* cited by examiner

*Primary Examiner* — Joseph J Nguyen
(74) *Attorney, Agent, or Firm* — Edell, Shapiro & Finnan, LLC (57) ABSTRACT

A method, a communication device and computer readable storage media facilitate engaging in communication session between a first communication device and another, i.e., a second communication device. One or more video frames received from the second communication device for display on the first communication device are captured. At least one video frame from the communication session is selected, at the first communication device, for use as a contact identifier associated with a contact person at the second communication device. The selected video frame for use as the contact identifier of the contact person is stored in a memory of the first communication device.

23 Claims, 7 Drawing Sheets

UTILIZING A VIDEO IMAGE FROM A VIDEO COMMUNICATION SESSION AS CONTACT INFORMATION

TECHNICAL FIELD

The present disclosure relates to video communications, such as video phone calls or video teleconferences, and the use of the video component after such communication.

BACKGROUND

Audio and video communications between two or more people (e.g., video conferencing, mobile or land-line video phone calls, etc.) are becoming more commonplace with advancing technologies in hardware and software associated with communication systems. In such audio and video communications, each person in the communication session utilizes a device that is configured with a camera that captures one or more images of the person and also a display screen that provides one or more images of at least one other person participating in the communication session.

Communication devices also typically include suitable memory to store information such as personalized configuration information for the device that has been set by the user, software applications for the device, etc. Communication devices are configured to store contact information for people, including names, telephone numbers and email addresses of individuals, which are accessible by the user in order to initiate a communication with another person with relative ease. For example, when a user wishes to contact an individual from the contact list of the user, the user can typically select the individual from the contact list (e.g., by selecting the name of the individual stored in the contact list), and the device is configured to utilize such information to initiate the communication with the individual.

Contact information can be entered manually by a user on the communication device during a period when the user is not communicating with anyone. Communication devices also provide a feature in which, after completing a communication with another person, the user has the option of populating the contact list with contact information of that person (e.g., in situations in which the person is not already in the user's contact list stored on the device).

DESCRIPTION OF EXAMPLE EMBODIMENTS

Overview

A method, a communication device and computer readable storage media facilitate engaging in communication session between a first communication device and another, i.e., a second communication device. One or more video frames received from the second communication device for display on the first communication device are captured. At least one video frame from the communication session is selected, at the first communication device, for use as a contact identifier associated with a contact person at the second communication device. The selected video frame of the contact person is stored in a memory of the first communication device.

Example Embodiments

Figure 1:
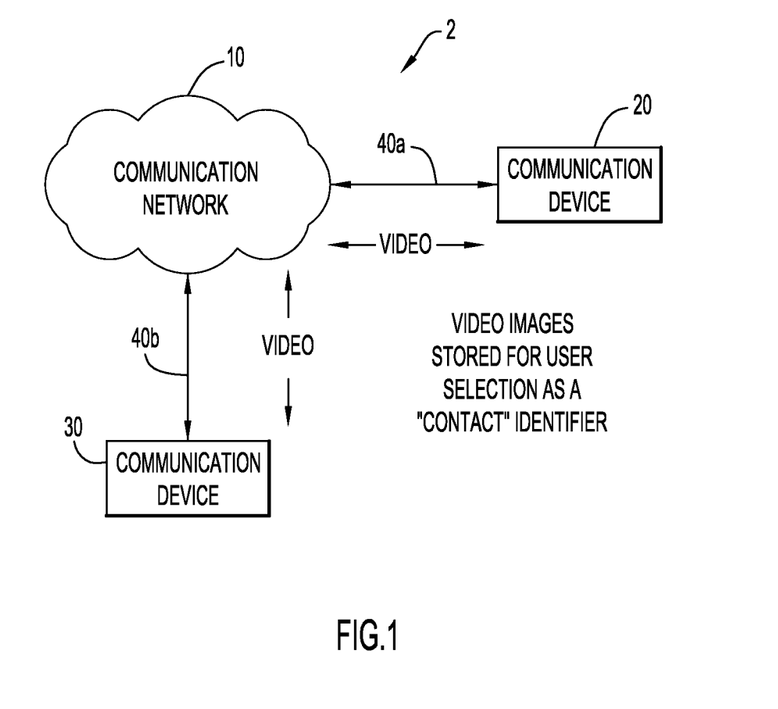
FIG. 1 is a schematic block diagram of an example system in which communication devices are connected to facilitate a video communication session between persons at two or more locations.

Referring to FIG. 1, a block diagram is shown for an example system that facilitates communications between people at two or more locations. The system 2 includes a communication network 10 (depicted as a cloud) that facilitates a connection or link between communication devices at different locations. The communication network 10 can be any suitable telecommunications network that facilitates transmission of information, including audio and video communication component streams between two or more devices connected with the network. Examples of types of networks that can be utilized include, without limitation, local or wide area networks, Internet Protocol (IP) networks such as intranet or internet networks, telephone networks (e.g., public switched telephone networks), wireless or mobile phone or cellular networks, and any suitable combinations thereof.

A plurality of communication devices are configured for communication over the communication network 10. As shown in FIG. 1, a first communication device 20 is connected via a suitable link 40a to the communication network 10, while a second communication device 30 is connected via a suitable link 40b to the communication network 10. Each communication link 40a, 40b can be of any suitable type, where the communication device is configured to connect with the communication network 10 via a wireless and/or hardwire connection. The communication links 40a, 40b further facilitate transfer of information between the two communication devices 20, 30 over the network 10 that includes both audio and video components. As indicated in FIG. 1, at least one of the communication devices 20 and 30, e.g., communication device 20, is configured to store video images obtained from a communication session for user selection as a "contact" identifier, as described further herein.

Figure 2:
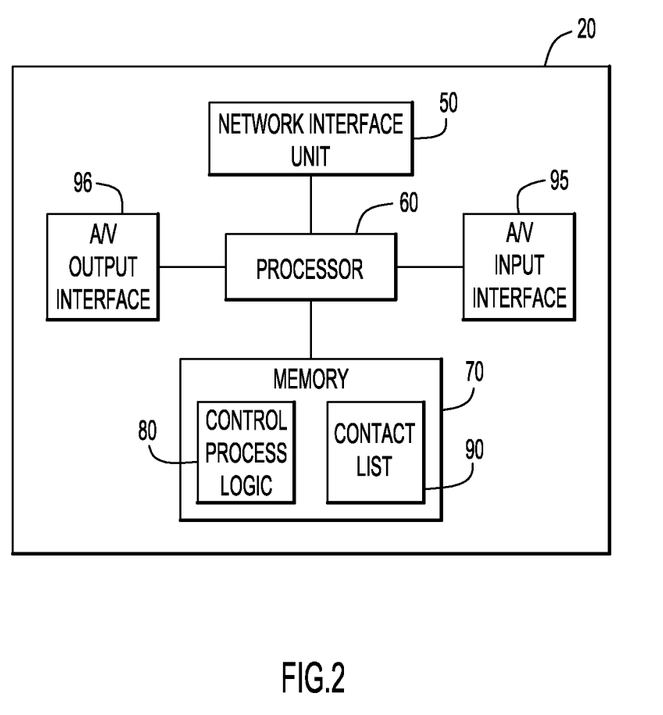
FIG. 2 is a schematic block diagram of an example communication device configured to establish an audio and video communication between the user of the device and at least one other individual utilizing the system of FIG. 1.

A block diagram is depicted in FIG. 2 of an example communication device, such as device 20, configured to establish an audio and video communication between the device 20 and at least one other device, such as device 30, utilizing the system of FIG. 1. In particular, the device 20 includes a network interface unit 50, a processor 60, and a memory 70. The network interface unit 50 can be, for example, an Ethernet interface card or switch, a modem, a router or any other suitable hardware device that facilitates a wireless and/or hardwire connection with the communication network 10, where the network interface unit can be integrated within the device or a peripheral that connects with the device. The processor 60 is a microprocessor or microcontroller that executes control process logic instructions 80

(e.g., operational instructions and/or downloadable or other software applications stored in memory 70).

The memory 70 of the communication device 20 can include random access memory (RAM) or a combination of RAM and read only memory (ROM), magnetic disk storage media devices, optical storage media devices, flash memory devices, electrical, optical, or other physical/tangible memory storage devices. The processor 60 executes the control process logic instructions 80 stored in memory 70 for controlling the device 20, including the performance of operations as set forth in the flowchart of FIG. 4. In general, the memory 70 may comprise one or more computer readable storage media (e.g., a memory device) encoded with software comprising computer executable instructions and when the software is executed (by the processor 60) it is operable to perform the operations described herein in connection with control process logic instructions 80. In addition, memory 70 includes a contact list 90 that includes saved contact information of other users that are accessible for lookup when the user of device 20 desires to contact another user in the contact list 90.

The communication device 20 also includes an audio and video (A/V) input interface 95 comprising a microphone and camera to receive and record/capture input media streams by the device 20 for transmission over the communication network 10 to other communication devices (such as device 30) during a communication session. The camera of the device 20 can be configured to capture a stream of video images or video frames at any suitable rate (e.g., 15 frames per second (fps) or greater), and the camera and microphone of the device can be configured to capture audio and video at any suitable digital quality (e.g., standard definition quality, high definition quality, etc.). The communication device 20 provides a media stream (e.g., in any suitable form of data packets) including audio and a corresponding plurality of captured video images or video frames over the network 10 to any one or more other communication devices to which the device 20 has established a connection and engages in a communication session.

The communication device 20 further includes an A/V output 96 comprising a speaker component and video display. The video display can be a liquid crystal display (LCD) or any other suitable type of display screen that facilitates a display of images at any suitable fps rate, including images received by the device 20 over the communication network 10 from other communication devices and also picture-in-picture (PIP) displays showing images received from other communication devices over the network 10 as well as images captured by the camera of the device 20. The display screen of the device 20 can also include some portion (e.g., some or all of the display screen) that serves as a touch screen to facilitate input of information by the user for implementing control of operations for the device. The speaker component can be configured to provide an audio output from the device of any suitable sound quality, including an audio portion of a media stream received over the communication network 10 from another communication device.

Communication device 30 may also have a suitable configuration that facilitates transmission and receipt of media data streams comprising audio and video components (e.g., communication device 30 can have a configuration that is the same or similar to communication device 20) so as to facilitate a video communication between the two devices 20, 30.

Each communication device (e.g., communication device 20 and/or communication device 30) can be any suitable device that is configured to engage in audio and video communications with one or more other devices. Some examples of devices that can be used include, without limitation, stationary (e.g., desktop) computers, personal mobile computer devices such as laptops, note pads, tablets, personal data assistant (PDA) devices, and other portable media player devices, cell phones (e.g., smartphones) including cameras and video display screens, and stationary (e.g., land line) phones including cameras and video display screens. The communication devices can utilize any suitable operating systems (e.g., Android, Windows, Mac OS, Symbian OS, RIM Blackberry OS, Linux, etc.) to facilitate operation, use and interaction of the communication devices with other communication devices over one or more communication networks.

Figure 3A:
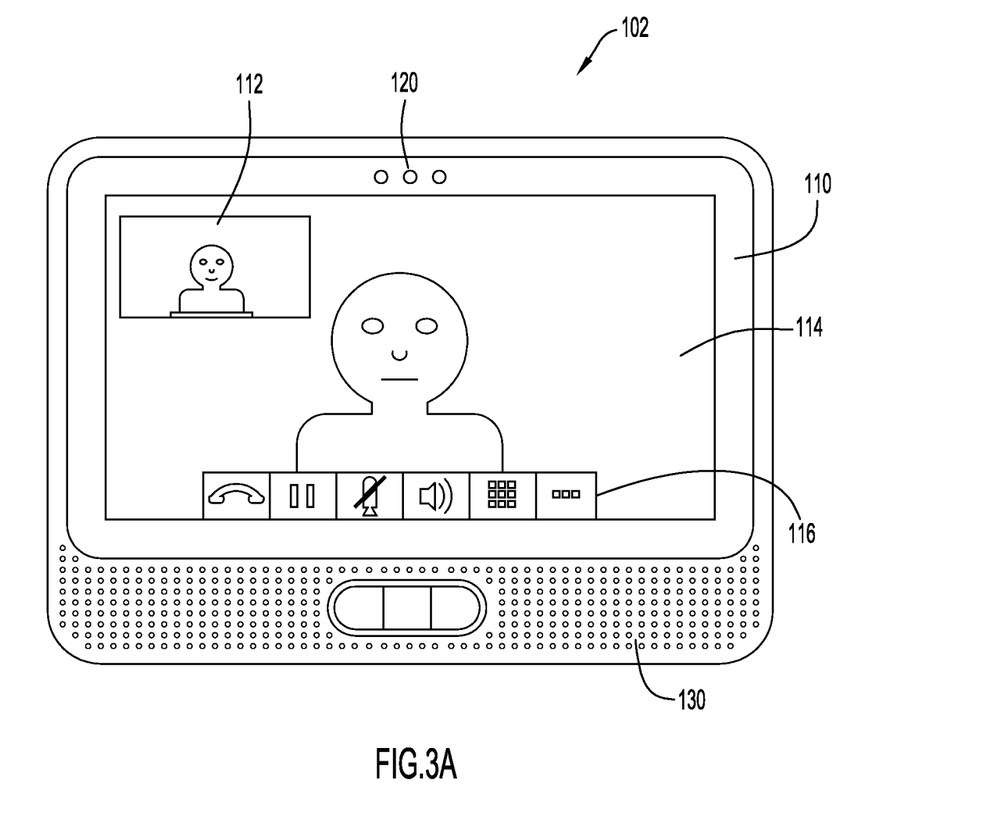
FIGS. 3A and 3B are example diagrams showing different types of communication devices configured for audio and video communication and to employ the contact image selection techniques described herein.
Figure 3B:
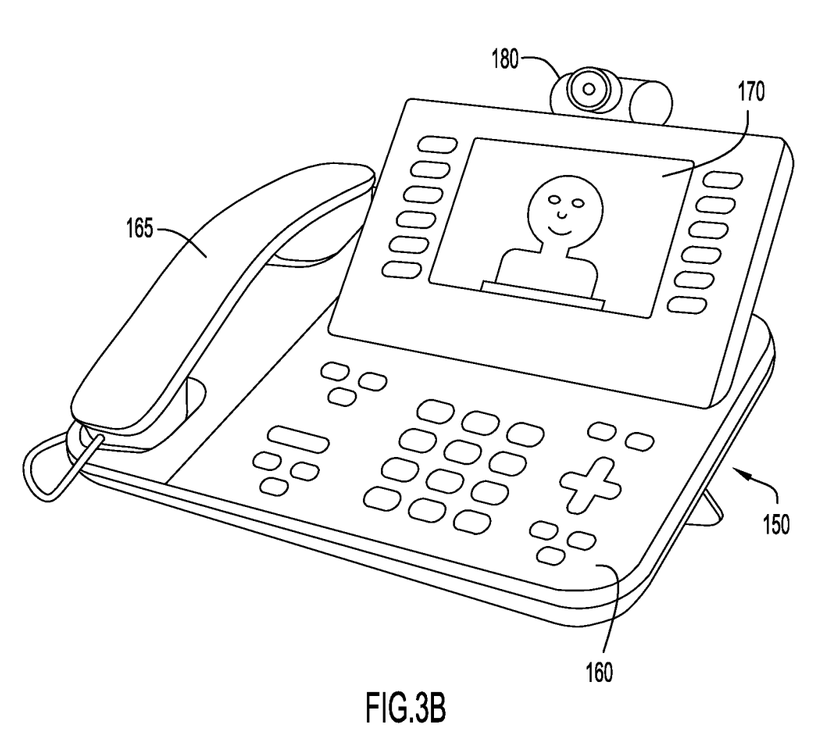

Two examples of communication devices are shown in FIGS. 3A and 3B. In FIG. 3A, a mobile computer device 102 (e.g., a tablet, PDA or similar device) is shown including a display screen 110, a camera 120, and a speaker/microphone 130. A PIP image is shown on the display screen 110, with the camera image (i.e., the image captured by the camera 120) shown in the display box 112 in the upper left corner and the background frame 114 showing an image of the video display received from another communication device with which the tablet device 102 is engaged in a communication session. The display screen 110 further includes a display box 116 which is a touch screen with buttons that provide user control functions (e.g., volume adjustment and other features associated with the video communication session). Other portable devices, such as smartphones and other types of cellular phones, can also have similar configurations to the device shown in FIG. 3A.

In FIG. 3B, a video phone 150 is shown including a keypad 160 for input of information (e.g., phone numbers) to the phone, a headset 165 including a speaker and microphone, a display screen 170 (e.g., an LCD screen) to display video received from another communication device to which the phone 150 is connected, and a camera 180 to capture video of the user of the phone 150 during a video communication. The video phone can connect with a communication network in any suitable manner. For example, a video phone can be a voice over Internet Protocol (VoIP) phone that facilitates transmission and receipt of audio and video data over an IP network (e.g., the Internet or an intranet).

Again, FIGS. 3A and 3B are examples of forms of video-capable communication devices 20 and/or 30 that are configured to perform the video image capture and contact identifier selection techniques described herein.

Referring again to FIG. 2, the processor 60 of communication device 20 is configured to record and save into memory 70 one or more video frames that are received from one or more other communication devices that connect with device 20 over the network 10 during a video communication. The selection of specific or candidate video frames for use as a contact identifier to be saved into memory 70 during the video communication can depend upon a number of criteria factors including, without limitation, video image quality, face detection and/or smile detection (utilizing facial recognition software or face detection software), etc. The saved candidate video frames can then be reviewed by the user and/or automatically chosen by the processor 60 (based upon an automated image criteria evaluation) for selection as a contact identifier of one or more specific video frames to be stored with the other information for a contact person (e.g., name, phone number, and/or email address, etc.) in the contact list 90 of the memory 70.

The processor 60 can utilize any suitable video quality analysis software that employs any selected metrics or algorithms to determine which candidate video frame or frames to select as a contact identifier from the video stream obtained from other communication devices during the video communication. For example, a video quality analysis can be utilized that ranks video frames based upon a number of factors including, without limitation, the number and/or types of artifacts in the video frames, the clarity of the video frames (as defined, e.g., by a measured brightness level and/or contrast level of the video frames), etc., where the ranking order of the video frames determines which video frames are candidates for final selection as a contact identifier to store in the contact list 90. For example, video frames with the fewest number of artifacts and/or measured brightness/contrast levels that are within a preferred range can be selected to have a higher or more preferential ranking in comparison to other video frames with undesirable artifacts and/or measured brightness/contrast levels that are undesirable.

The processor 60 can further utilize any suitable (now known or hereinafter developed) face detection software that is capable of detecting a human face within each video frame utilizing object-class detection and face localization techniques (e.g., based upon known techniques for identification of a head within an image, detection of eye structures, identification of nose structures, identification of distance between eye structures and nose structures, identification of mouth structures, etc.). The face detection software can be utilized to ensure that at least some of the candidate video frames captured from an audio and video communication have a detected human face within each frame. More sophisticated face detection software can also be utilized by the processor 60 to detect a predetermined expression, e.g., a facial expression such as smile on a human face, or other expression that includes a facial expression combined with a physical gesture, etc., within one or more candidate video frames utilizing known expression ("smile") detection techniques.

Figure 4:
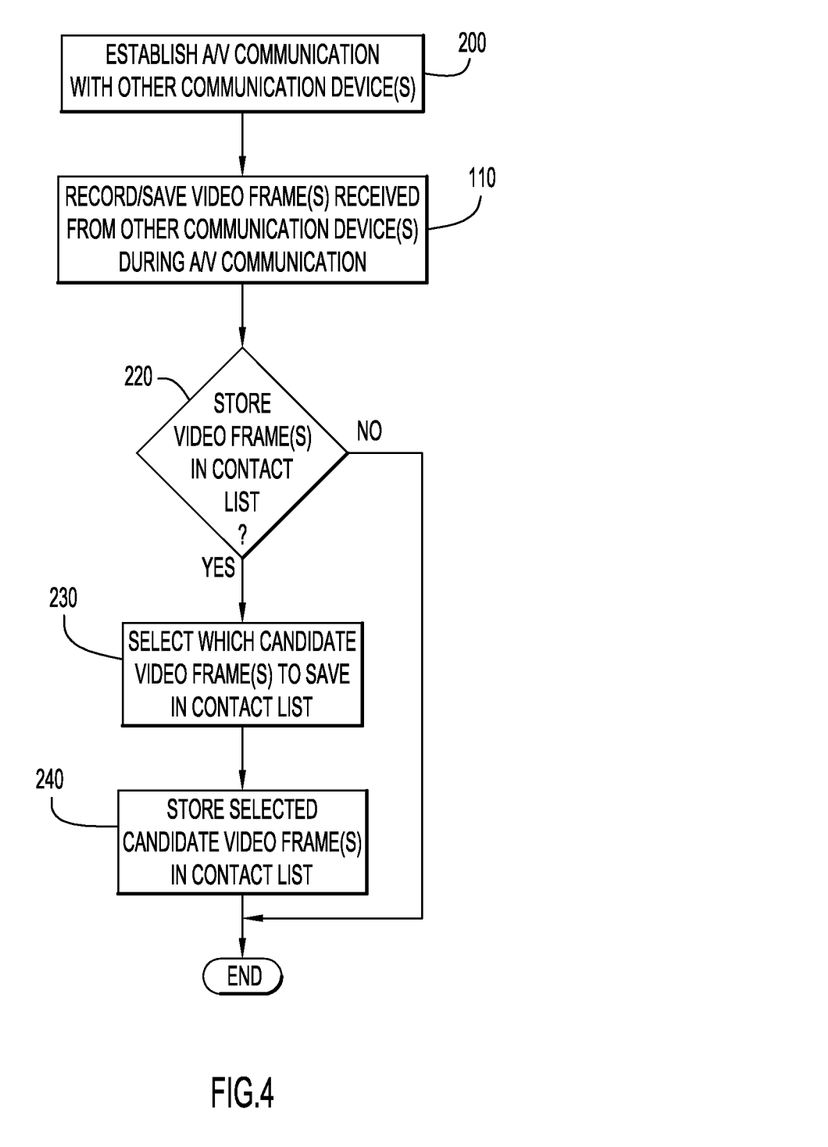
FIG. 4 is a flow chart that depicts an example process for operating the device of FIG. 2 to perform the contact image selection techniques described herein.

Operation of the communication device 20 is now described with reference to the flowchart of FIG. 4. At 200, the communication device 20 establishes an audio and video communication (e.g., a video phone call) with one or more other communication devices (e.g., communication device 30) over the communication network 10. During the audio and video communication, the communication device 20 records a media stream comprising audio and video components, via the input interface 95 (e.g., microphone and camera) of the device 20, and transmits the media stream over the network 10 to the other communication device(s). In addition, the communication device 20 receives a media stream comprising audio and video components, via the network interface unit 50, from the other communication device(s) and outputs the media stream via the output interface 96 (e.g., speaker and display screen) of the device 20.

At 210, the processor 60 of the communication device 20 records and saves into memory 70 a selected number of candidate video frames that have been received from the other communication device(s) over the network 10 during the audio and video communication session. The specific selection of which candidate video frames are to be saved can be accomplished utilizing any of the parameters described above in relation to video quality assessment and face (and/or smile) recognition for video frames. Alternatively, the processor can save video frames from any randomly selected time period of the video communication (e.g., a selected number of seconds or minutes at any portion of the video communication). However, the processor preferably selects a stream of video frames in which face recognition has been confirmed for at least one or more video frames that are saved in memory 70 (i.e., so as to ensure that a person's face at the other communication device has been captured in one or more of the video frames transmitted by the other communication device).

After the video communication has ended, the user of communication device 20 can make a decision, at 220, regarding whether to add a user (contact person) of the other communication device(s) involved in the video communication to the contact list 90 of device 20. The addition of the user information can include information such as the phone number, name, email address, etc., of the user along with one or more of the candidate video frames saved from the audio and video communication. Alternatively, in the event the user of the other communication device is already in the contact list 90 of device 20, a determination can be made regarding whether to add one or more of the candidate video frames saved from the video communication to the contact list and associated with the contact information of that person.

In the event the user of the communication device 20 decides not to add any contact information from the audio and video communication to the contact list 90, the video frames that have been saved can be deleted from memory 70 and the process ends.

In the event the user decides to add one or more video frames to the contact list 90 corresponding with the contact information of the user associated with the other communication device from the audio and video communication session, a determination is made at 230 regarding which is/are the best candidate video frame(s) to be selected from the video frames saved in memory 70. The selection of the one or more best video frames can be achieved automatically by the processor 60, utilizing software stored in the control process logic 80 of memory 70 that implements any one or combination of algorithms to assess video quality analysis metrics, face detection and/or smile detection in order to rank the candidate frames that are most suitable for storing in the contact list 90. Alternatively, the user of the device 20 can review the candidate video frames and manually make a selection of one or more video frames to be saved with the other contact information for the contact person in the contact list 90. Further, a combination of automatic selection of a set number of candidate frames (e.g., as many as 10 video frames or more) can be automatically selected by the processor 60 for review by the user of the device 20, where the user then narrows down the selection (based upon personal user preference) to one or more video frames for saving in the contact list 90 along with the other contact information associated with the contact person.

Figure 5A:
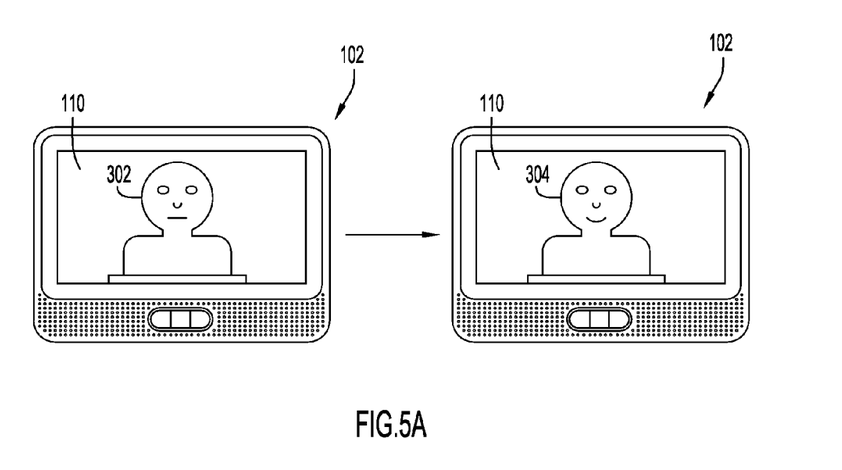
FIGS. 5A and 5B illustrate example embodiments for the selection of one or more candidate video frames for storage in a contact list of a communication device.
Figure 5B:
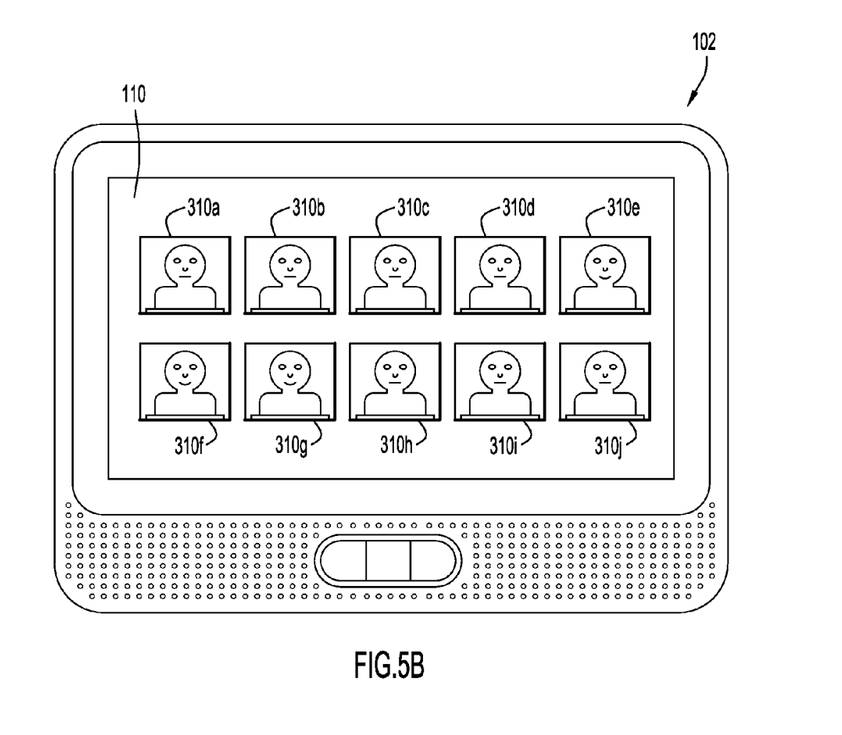

Some example embodiments in which the user manually selects one or more candidate frames for saving in the contact list 90 of the communication device 20 are depicted in FIGS. 5A and 5B utilizing the device 102 of FIG. 3A. In FIG. 5A, the display screen 110 of the device 102 shows a single candidate video frame with the image 302 of the contact person that was captured during the audio and video communication session and stored in memory 70 of the device 102. The user of device 102 can choose to review other candidate video frames by, for example, swiping on the display screen 110 (which also serves as a touch screen) to the left or to the right so as to advance to the previous or the next candidate video frame. For example, as shown in FIG. 5A, the user can swipe to the right on the display screen 110 so as to change from the image 302 of the contact person shown in one candidate video frame to another image 304 of the contact person in the next candidate video frame stored in memory 70. The user of device 102 can make a selection of which candidate video frame to choose for storage along with the other contact information of the contact person in the contact list 90 (e.g., the user might choose the candidate frame including image 304, which includes a smiling facial image of the contact person).

In FIG. 5B, the display screen 110 of the device 102 shows a plurality of candidate video frames 310*a*-310*j* showing images of the contact person that were captured during the audio and video communication session and stored in memory 70 of the device 102. In this example embodiment, the user of the device 102 can select one or more video frames (e.g., by touching the frame(s) on the display screen 110) for saving with the contact information of the contact person in the contact list 90. For example, the user may choose to save one or more of frames 310*e*-310*g*, since these frames provide a smiling facial image of the contact person.

In a further example embodiment, a video clip (i.e., a combined selected number of consecutive video frames) can be selected from the stored candidate frames of the contact person for storage with the other contact information of the contact person in the contact list 90 of memory 70. The selection of the video clip for storage in the contact list 90 can be performed automatically by the processor 60 (e.g., using candidate video frame selection criteria such as the types described above) or manually by the user.

Referring back to FIG. 4, after a selection has been made regarding which candidate video frame(s) to save along with the other contact information of the contact person in the contact list 90, such selected candidate video frame(s) are stored in the contact list 90 at 240, and the process ends.

Figure 6:
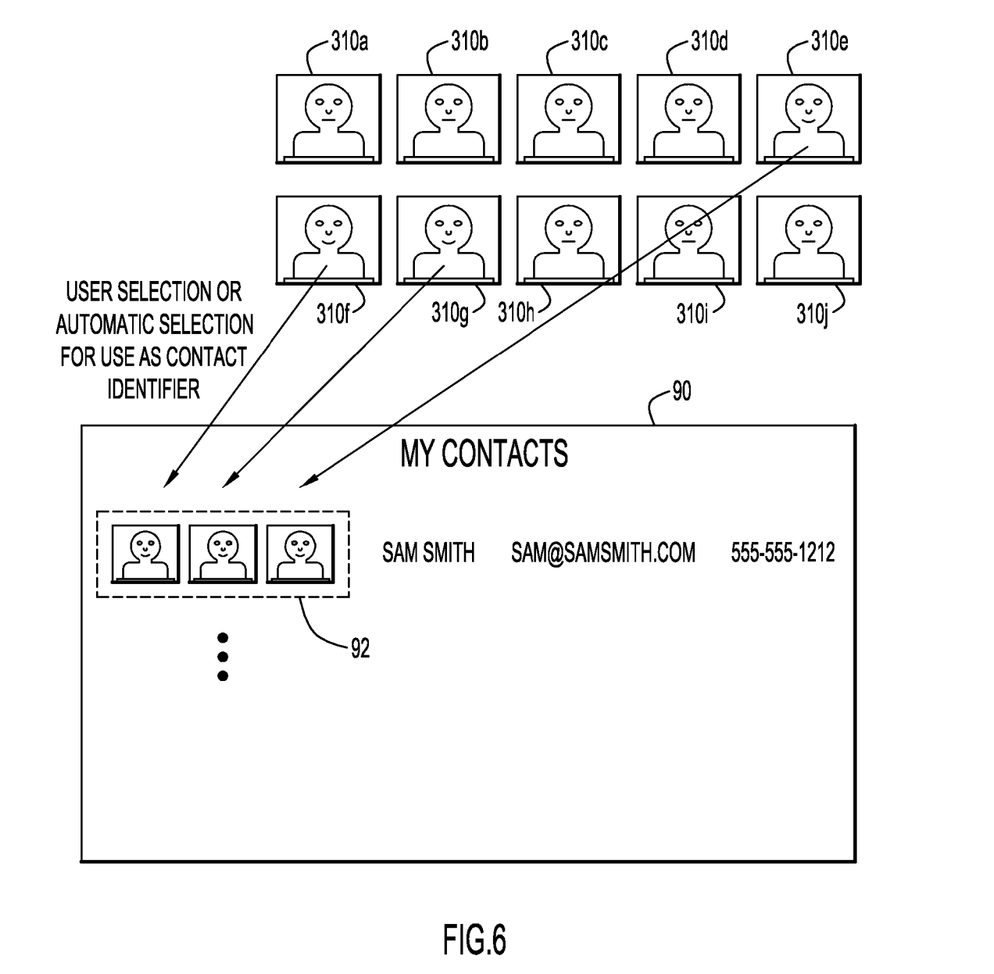
FIG. 6 illustrates an example embodiment of populating a contact list of a communication device with one or more selected video frames obtained from a communication with another communication device.

An example embodiment of storing selected video frame(s) in the contact list 90 of communication device 102 is shown in FIG. 6, where the selected video frames are obtained from the plurality of candidate video frames depicted in FIG. 5B. The user makes a selection of one or more video frames of the contact person (Sam Smith) to store in the contact list 90 as a contact identifier 92, along with other information associated with the contact person (e.g., the contact person's full name, email address and phone number). Alternatively, the processor 60 of the communication device 102 can be configured to make an automatic selection of a specified one or more video frames for storage as the contact identifier 92 in the contact list 90. As shown in FIG. 6, candidate video frames 310*e*-310*g* have been selected as the contact identifier 92 for this contact person. When the user of device decides to look up that contact person in the contact list 90, one or more of the selected video frames 310*e*-310*g* from the contact identifier 92 are displayed on the display screen 110 of the device 102 to provide further information about the contact person. In addition, the contact device 102 can be configured to identify when this contact person initiates a communication request with device 102 (e.g., utilizing a caller ID function of the device 102), such that one or more of the video frames 310*e*-310*g* of the contact identifier 92 are displayed on the device display screen 110 when the communication is initiated.

In a further optional embodiment, the communication device can further be configured to store an audio portion of the audio and video communication session along with the video frame(s) of the contact person in the contact list. For example, if the user of the communication device would like to store a video clip of the contact person (i.e., a series of consecutive video clips) taken from the audio and video communication session, both audio and video components can be stored together for this video clip in the contact list of the device. Alternatively, the user may choose to store a single image (i.e., single video frame) of the contact person along with a selected audio clip taken from the audio and video communication in the contact list.

The video frame(s) (and, optionally, audio clip) stored for a contact person in the contact list can be used by the communication device when the user decides to look up the contact person in the user's list (e.g., to engage in a communication session with the contact person). For example, the communication device can be configured to display on the display screen the video frame(s) (and also play any audio clip saved with such video frame(s)) of the contact person based upon user request or when the user selects this contact person from the contact list. This provides more personalized information about the contact person in the contact list. In addition, the communication device can be configured to display the video frame(s) (and play any audio clip) associated with the contact person when that contact person has initiated a communication session with the communication device (e.g., at an incoming phone call by the contact person to the communication device).

In another optional embodiment, the communication device can have access to a directory of contact persons (e.g., an employee directory stored on a database accessible by the user). The directory may already provide an image of a contact person. The user might choose to utilize an alternative image of a contact person based upon the video frame(s) captured by the communication device during a communication with the contact person. The communication device can be configured to store such alternative video frame(s) of the contact person for use with the directory or, alternatively, the communication device can be configured to provide such alternative video frame(s) to the directory for storage in association with that contact person.

Thus, the methods and communication devices described herein facilitate the use of a portion of the audio and video communication between a user of the device and a contact person to populate one or more video frames including the image of a contact person in the contact list of the device. This provides an easy mechanism for personalizing the user's contact list by having a photo image or a video clip of one or more contact persons associated with the other contact information for such contact persons in the contact list. In addition, the selection of one or more specific video frames from the audio and video communication session (performed automatically by the processor and/or manually by the user selecting specific candidate video frame(s)) ensures that the best images of the contact persons are being stored in the contact list.

The above description is intended by way of example only.

What is claimed is:

1. A method comprising:
capturing one or more video frames received at a first communication device from a second communication device for display by the first communication device during a communication session between the first communication device and second communication device;
selecting, at the first communication device, at least one video frame from the communication session for use as a contact identifier associated with a contact person at the second communication device; and
storing the at least one selected video frame in the first communication device.

2. The method of claim 1, and further comprising receiving at the first communication device a plurality of video frames of the contact person, and wherein selecting the at least one video frame is at least partially automated by the first communication device.

3. The method of claim 2, wherein selecting comprises automatically selecting at least one video frame from the communication session based upon a video quality analysis of at least a portion of the plurality of video frames.

4. The method of claim 2, wherein selecting comprises automatically selecting at least one video frame from the communication session based upon a recognition of a human face being within the at least one video frame.

5. The method of claim 4, wherein selecting comprises automatically selecting the at least one video frame from the communication session based upon recognition of a predetermined expression of the contact person.

6. The method of claim 1, wherein selecting the at least one video frame of the contact person from the communication session comprises:
displaying a plurality of candidate video frames; and
receiving input for selection of one or more video frames for use as the contact identifier from the candidate video frames for storage.

7. The method of claim 1, further comprising:
displaying the at least one selected video frame stored in the first communication device upon receiving a communication request from the second communication device.

8. The method of claim 1, wherein selecting comprises selecting a video clip including a plurality of consecutive video frames captured during the video communication session.

9. An apparatus comprising:
a network interface unit configured to enable communications over a communication network in order to support a communication session that includes a plurality of video frames transmitted by another communication device over the network;
a display screen configured to display video frames received from the other communication device during the communication session;
a memory configured to store data; and
a processor configured to capture and store in the memory at least one selected video frame received from the other communication device for use as a contact identifier associated with a contact person at the other communication device, wherein the processor is further configured to enable a selection at the apparatus of the at least one video frame from the communication session with the other communication device.

10. The apparatus of claim 9, wherein the processor is further configured to:
capture a plurality of video frames of the contact person received from the other communication device during the communication session; and
automatically select at least one video frame for use as the contact identifier from the plurality of captured video frames.

11. The apparatus of claim 9, wherein the processor is configured to automatically select the at least one video frame from the plurality of captured video frames based upon a video quality analysis of at least a portion of the plurality of captured video frames.

12. The apparatus of claim 9, wherein the processor is configured to automatically select the at least one video frame from the plurality of captured video frames based upon a recognition of a human face within the at least one video frame.

13. The apparatus of claim 12, wherein the processor is configured to automatically select the at least one video frame from the plurality of captured video frames based upon a recognition of a predetermined expression of the contact person.

14. The apparatus of claim 9, wherein the processor is further configured to:
display on the display screen a plurality of candidate video frames captured during the communication session; and
receive input for selection of one or more video frames for use as the contact identifier from the candidate video frames for storage in the memory.

15. The apparatus of claim 9, wherein the processor is further configured to:
display the at least one selected video frame stored in the memory upon receiving a communication request from the other communication device.

16. The apparatus of claim 9, wherein the processor is configured to store in the memory for use as the contact identifier associated with the contact person a selected video clip including a plurality of consecutive video frames captured during the video communication session.

17. One or more computer readable storage media encoded with software comprising computer executable instructions and when the software is executed operable to:
during a communication session between a first communication device and a second communication device, capture at the first communication device one or more video frames for display by the first communication device;
select, at the first communication device, at least one video frame from the communication session for use as a contact identifier associated with a contact person at the second communication device; and
store the at least one selected video frame in a memory of the first communication device.

18. The computer readable storage media of claim 17, wherein the instructions that are operable to capture comprise instructions operable to capture a plurality of video frames of the contact person, and the instructions that are operable to select comprise instructions that are operable to automatically select at least one video frame from the communication session based upon a video quality analysis of at least a portion of the plurality of video frames.

19. The computer readable storage media of claim 17, wherein the instructions that are operable to capture comprise instructions operable to capture a plurality of video frames of the contact person, and the instructions that are operable to select comprise instructions that are operable to automatically select at least one video frame from the communication session based upon a recognition of a human face within the at least one video frame.

20. The computer readable storage media of claim 17, wherein the instructions that are operable to select comprise instructions that are operable to automatically select the at least one video frame from the communication session based upon a recognition of a predetermined expression of the contact person.

21. The computer readable storage media of claim 17, and further comprising instructions that are operable to:
display at the first communication device a plurality of candidate video frames; and
receive input for selection of one or more video frames for use as the contact identifier from the candidate video frames for storage in the memory.

22. The computer readable storage media of claim 17, and further comprising instructions that are operable to:
display the at least one selected video frame stored in the memory of the first communication device upon receiving a communication request from the second communication device.

23. The computer readable storage media of claim 17, wherein the instructions that are operable to store at least one video frame comprise instructions that are operable to store a selected video clip as the contact identifier associated with the contact person including a plurality of consecutive video frames captured during the video communication session.

\* \* \* \* \*